(12) United States Patent
Smith, III

(10) Patent No.: US 7,578,312 B2
(45) Date of Patent: Aug. 25, 2009

(54) HYDRAULIC COUPLING MEMBER WITH DISPLACED WATER COMPENSATION SYSTEM

(75) Inventor: Robert E. Smith, III, Missouri City, TX (US)

(73) Assignee: National Coupling Company, Inc., Stafford, TX (US)

( * ) Notice: Subject to any disclaimer, the term of this patent is extended or adjusted under 35 U.S.C. 154(b) by 371 days.

(21) Appl. No.: 11/696,291

(22) Filed: Apr. 4, 2007

(65) Prior Publication Data
US 2008/0245426 A1  Oct. 9, 2008

(51) Int. Cl.
F16L 37/28  (2006.01)
(52) U.S. Cl. ............ 137/614.04; 137/81.2; 137/614.02; 251/50; 251/149.7
(58) Field of Classification Search ................ 137/81.1, 137/81.2, 613–614.05; 251/50, 149.1, 149.6, 251/149.7, 149.9; 285/101, 106
See application file for complete search history.

(56) References Cited

U.S. PATENT DOCUMENTS

| | | | | |
|---|---|---|---|---|
| 1,913,982 | A | * | 6/1933 | Fox .......................... 251/149.6 |
| 2,384,169 | A | * | 9/1945 | Huck et al. .................. 137/613 |
| 2,644,481 | A | * | 7/1953 | Perlman ...................... 251/50 |
| 3,144,056 | A | * | 8/1964 | Mosher ................. 137/614.05 |
| 3,348,575 | A | * | 10/1967 | Simak .................... 137/614.05 |
| 4,222,411 | A | * | 9/1980 | Herzan et al. .......... 137/614.04 |
| 4,694,859 | A | | 9/1987 | Smith, III |
| 4,817,668 | A | | 4/1989 | Smith, III |
| 4,832,080 | A | * | 5/1989 | Smith, III .............. 137/614.04 |
| 4,858,648 | A | * | 8/1989 | Smith et al. ............ 137/614.04 |
| 4,884,584 | A | | 12/1989 | Smith |
| 5,029,613 | A | | 7/1991 | Smith, III |
| 5,099,882 | A | | 3/1992 | Smith, III |
| 5,203,374 | A | | 4/1993 | Smith, III |
| 5,284,183 | A | | 2/1994 | Smith, III |
| 5,339,861 | A | | 8/1994 | Smith, III |
| 5,355,909 | A | | 10/1994 | Smith, III |
| 5,360,035 | A | * | 11/1994 | Smith .................... 137/614.04 |

(Continued)

FOREIGN PATENT DOCUMENTS

GB  2 208 693 A  12/1989

(Continued)

OTHER PUBLICATIONS

"Patents Act 1977: Combined Search and Examination Report Under Sections 17 and 18(3);" Received in corresponding application No. GB 0805760.6 dated Jun. 11, 2008.

Primary Examiner—John Rivell
Assistant Examiner—Craig Price
(74) Attorney, Agent, or Firm—Wong, Cabello, Lutsch, Rutherford & Brucculeri, LLP

(57) ABSTRACT

A female hydraulic coupling member is equipped with an internal displaced water compensation system comprising a spring-biased piston in a generally axial cylinder bored into the coupling body and that is offset from the central axial bore. The cylinder is in fluid communication with an interior portion of the receiving chamber such that seawater within the receiving chamber that is displaced by the probe of a male coupling member inserted in the receiving chamber may move into the cylinder of the displaced water compensation system. During coupling separation, the process is reversed and seawater retained in the displaced water compensation system moves into the receiving chamber under the influence of the spring-biased piston thereby preventing a vacuum.

7 Claims, 2 Drawing Sheets

U.S. PATENT DOCUMENTS

| | | | | |
|---|---|---|---|---|
| 5,469,887 | A * | 11/1995 | Smith, III | 137/614.04 |
| 5,979,499 | A | 11/1999 | Smith | |
| 6,123,103 | A | 9/2000 | Smith, III | |
| 6,179,002 | B1 | 1/2001 | Smith, III | |
| 6,343,630 | B1 * | 2/2002 | Dubinsky | 137/614.05 |
| 6,575,430 | B1 | 6/2003 | Smith, III | |
| 6,631,734 | B2 | 10/2003 | Smith, III | |
| 6,923,476 | B2 | 8/2005 | Smith, III | |
| 6,962,347 | B2 | 11/2005 | Smith, III | |
| 7,021,677 | B2 | 4/2006 | Smith, III | |
| 7,163,190 | B2 | 1/2007 | Smith, III | |
| 2004/0031526 | A1 * | 2/2004 | Parrish et al. | 137/514.3 |

FOREIGN PATENT DOCUMENTS

| | | |
|---|---|---|
| GB | 2 269 216 A | 2/1994 |
| GB | 2 272 032 A | 4/1994 |
| GB | 2 299 390 A | 2/1996 |
| GB | 2 329 945 A | 7/1999 |
| GB | 2 378 994 | 2/2003 |
| GB | 2 379 254 A | 5/2003 |

* cited by examiner

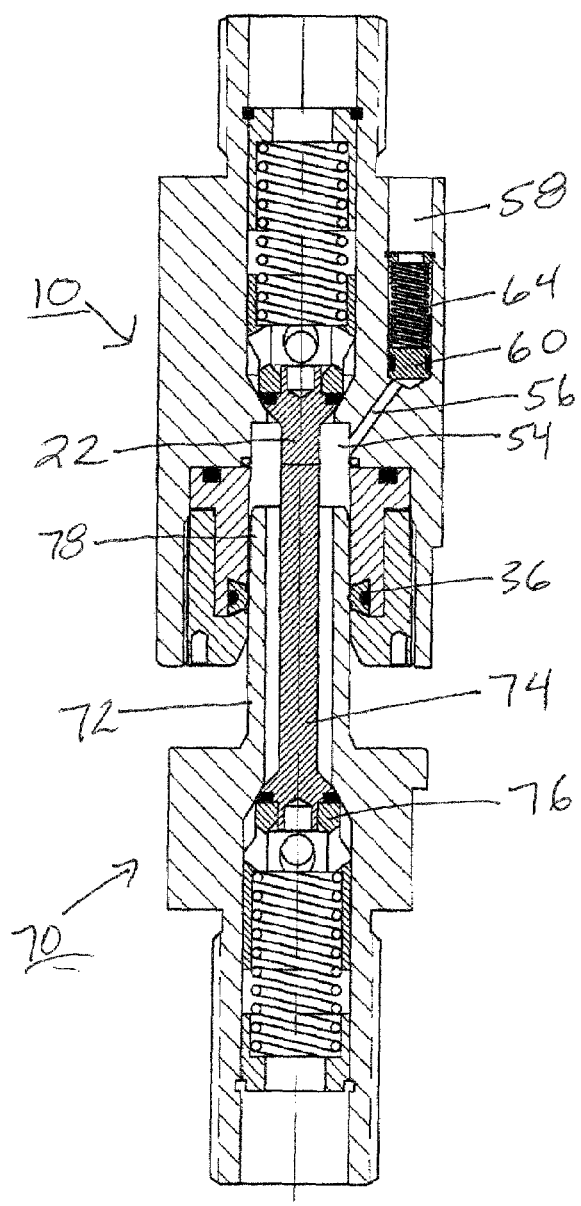
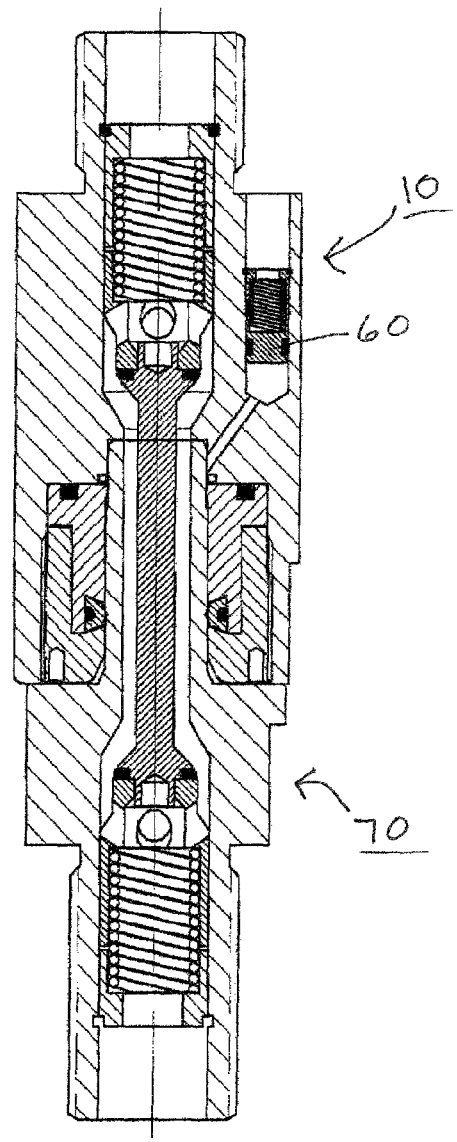
FIGURE 2A
FIGURE 2B

HYDRAULIC COUPLING MEMBER WITH DISPLACED WATER COMPENSATION SYSTEM

CROSS-REFERENCE TO RELATED APPLICATIONS

NONE

STATEMENT REGARDING FEDERALLY SPONSORED RESEARCH OR DEVELOPMENT

NONE

BACKGROUND OF THE INVENTION

1. Field of the Invention

This invention relates to hydraulic couplings. More particularly, it relates to undersea hydraulic couplings used in fixed volume systems.

2. Description of the Related Art

A wide variety of undersea hydraulic couplings are available. Examples of undersea hydraulic couplings having metal seals include U.S. Pat. No. 4,694,859 for "Undersea hydraulic coupling and metal seal" U.S. Pat. No. 4,817,668 for "Integral metal seal for hydraulic coupling" U.S. Pat. No. 4,884,584 for "Internally preloaded metal-to-metal seal hydraulic connector" U.S. Pat. No. 5,029,613 for "Hydraulic coupler with radial metal seal" U.S. Pat. Nos. 5,099,882 and 5,203,374 for "Pressure balanced hydraulic coupling with metal seals" U.S. Pat. No. 5,284,183 for "Hydraulic coupler with radial metal seal" U.S. Pat. No. 5,339,861 for "Hydraulic coupling with hollow metal o-ring seal" U.S. Pat. No. 5,355,909 for "Undersea hydraulic coupling with metal seals" U.S. Pat. No. 5,979,499 for "Undersea hydraulic coupling with hollow metal seal" U.S. Pat. No. 6,962,347 for "Metal backup seal for undersea hydraulic coupling" and U.S. Pat. No. 7,021,677 for "Seal retainer with metal seal members for undersea hydraulic coupling" all to Robert E. Smith III and assigned to National Coupling Company of Stafford, Tex.

Other undersea hydraulic couplings employ only "soft seals"—i.e., non-metal seals that are typically formed of an elastomeric polymer ("elastomer") or an engineering plastic capable of being machined such as polyetheretherketone ("PEEK") or DELRIN® acetal resin.

By way of example, U.S. Pat. No. 6,123,103 discloses a pressure balanced hydraulic coupling for use in undersea drilling and production operations. The coupling has radial passages connecting between the male and female members such that fluid pressure is not exerted against the face of either member during coupling or uncoupling. The female member has a split body with a first part and a second part, each having a longitudinal passage and a radial fluid passage. A radial seal is positioned on the junction between the first and second parts of the female member body to facilitate removal and replacement of the radial seal when the split body is disassembled. The male member may be inserted through the first and second parts of the female coupling member, thereby establishing fluid communication between the coupling members in a direction transverse to the coupling member bores.

U.S. Pat. No. 6,179,002 discloses an undersea hydraulic coupling having a radial pressure-energized seal with a dovetail interfit with the coupling body. The seal has a pair of flexible sealing surfaces for sealing with the male and female coupling members and a cavity therebetween that is exposed to fluid pressure in the coupling. The outer circumference of the seal has a dovetail interfit between inclined shoulders in the female member bore and on a seal retainer that holds the seal in the bore.

U.S. Pat. No. 6,575,430 discloses an undersea hydraulic coupling member having a ring-shaped seal with multiple sealing surfaces extending radially inwardly therefrom. The multiple sealing surfaces help guide the probe of the male coupling member into the female member without the risk of drag or galling of the receiving chamber. The seal has an interfit with reverse inclined shoulders in the female member to restrain the seal from moving radially inwardly due to vacuum or low pressure. Attention is invited in particular to the embodiments shown in FIGS. 8 and 9 of this patent.

U.S. Pat. No. 6,923,476 discloses a floating seal for an undersea hydraulic coupling member that is moveable radially to seal with the male coupling member even if there is some misalignment with the female coupling member. The floating seal is restricted from axial movement within the female coupling member receiving chamber. The floating seal may seal with the female coupling member.

U.S. Pat. No. 7,163,190 discloses a seal cartridge for an undersea hydraulic coupling member having an inner ring and an outer ring. The inner ring and outer ring are concentric and at least part of the inner ring is inserted through the outer ring. The outer ring is threaded to the coupling member and the installed seal cartridge may act to retain an elastomeric seal on a shoulder surface in the coupling member Another elastomeric seal is held between the inner ring and outer ring of the seal cartridge.

For hydraulic couplings used in undersea applications, it is common for the receiving chamber of the female coupling member to be filled with seawater before the two coupling members are joined. When the probe of the male member is inserted in the receiving chamber of the female member, it displaces the seawater in the receiving chamber. However, when the male probe is inserted sufficiently to engage the sealing members of the coupling, the seawater cannot escape and the male probe acts as a piston in a cylinder and, in the couplings of the prior art, seawater is pushed into the hydraulic system when the pressure increases to the point that the poppet valves in the coupling open.

In larger hydraulic systems, the volume of seawater that enters the system in this way is not a significant fraction of the total. However, it is generally undesirable to have seawater in a hydraulic system and, particularly in smaller systems without accumulators to compensate for the increased volume of fluid in the system, a hydraulic lock situation may occur and prevent the full mating of the coupling members. The present invention solves this problem.

U.S. Pat. No. 6,631,734 discloses a dummy undersea hydraulic coupling member for protecting an opposing undersea hydraulic coupling member when the hydraulic lines are not operating. The dummy undersea hydraulic coupling member has a water displacement expansion chamber with a piston therein that allows trapped water and/or air to move from the receiving chamber to the water displacement expansion chamber during connection of the dummy coupling member to the opposing coupling member. When the dummy coupling member is connected to an opposing coupling member subsea, seawater and/or air in the receiving chamber of the dummy is displaced by the opposing coupling member. That seawater and/or air enters the water displacement expansion chamber, and the piston allows the volume of that chamber to increase as a result of pressure from displaced seawater and/or air acting on the front face of the piston until the chamber reaches the volume required for a pressure equilibrium. When the dummy coupling member is disconnected from the opposing coupling member undersea, seawater pressure acting on the back face of the piston tends to urge the piston in a direction which decreases the volume of the water displacement expansion chamber, thus allowing the trapped seawater (and/or air) to re-enter the receiving chamber and thereby prevent a vacuum in the receiving chamber. The piston decreases the size of the water displacement expansion chamber until it reaches the volume required to establish pressure equilibrium.

SUMMARY OF THE INVENTION

A female hydraulic coupling member is equipped with a water displacement expansion chamber and a piston for varying the volume of the water displacement expansion chamber in response to the pressures acting on the opposing faces of the piston. When the female coupling member is mated to an opposing male coupling member subsea, seawater and/or air in the receiving chamber of the female member is displaced by the probe of the opposing coupling member. That seawater and/or air enters the water displacement expansion chamber, and the piston moves to allow the volume of that chamber to increase as a result of pressure from displaced seawater and/or air acting on the front face of the piston until the chamber reaches the volume required for pressure equilibrium to obtain.

When the female coupling member is disconnected from the male coupling member subsea, seawater pressure acting on the back face of the piston tends to urge the piston to move in a direction which decreases the volume of the water displacement expansion chamber, thus allowing the trapped seawater and/or air to re-enter the receiving chamber and prevent a vacuum in the receiving chamber. The piston moves to decrease the size of the water displacement expansion chamber until it reaches the volume required for pressure equilibrium.

BRIEF DESCRIPTION OF THE SEVERAL VIEWS OF THE DRAWING(S)

FIG. 2A is a cross-sectional view of a female hydraulic coupling member illustrated in FIG. 1 in partial engagement with a corresponding male hydraulic coupling member.

FIG. 2B is a cross-sectional view of a female hydraulic coupling member illustrated in FIG. 1 in full engagement with a corresponding male hydraulic coupling member.

DETAILED DESCRIPTION OF THE INVENTION

Figure 1:
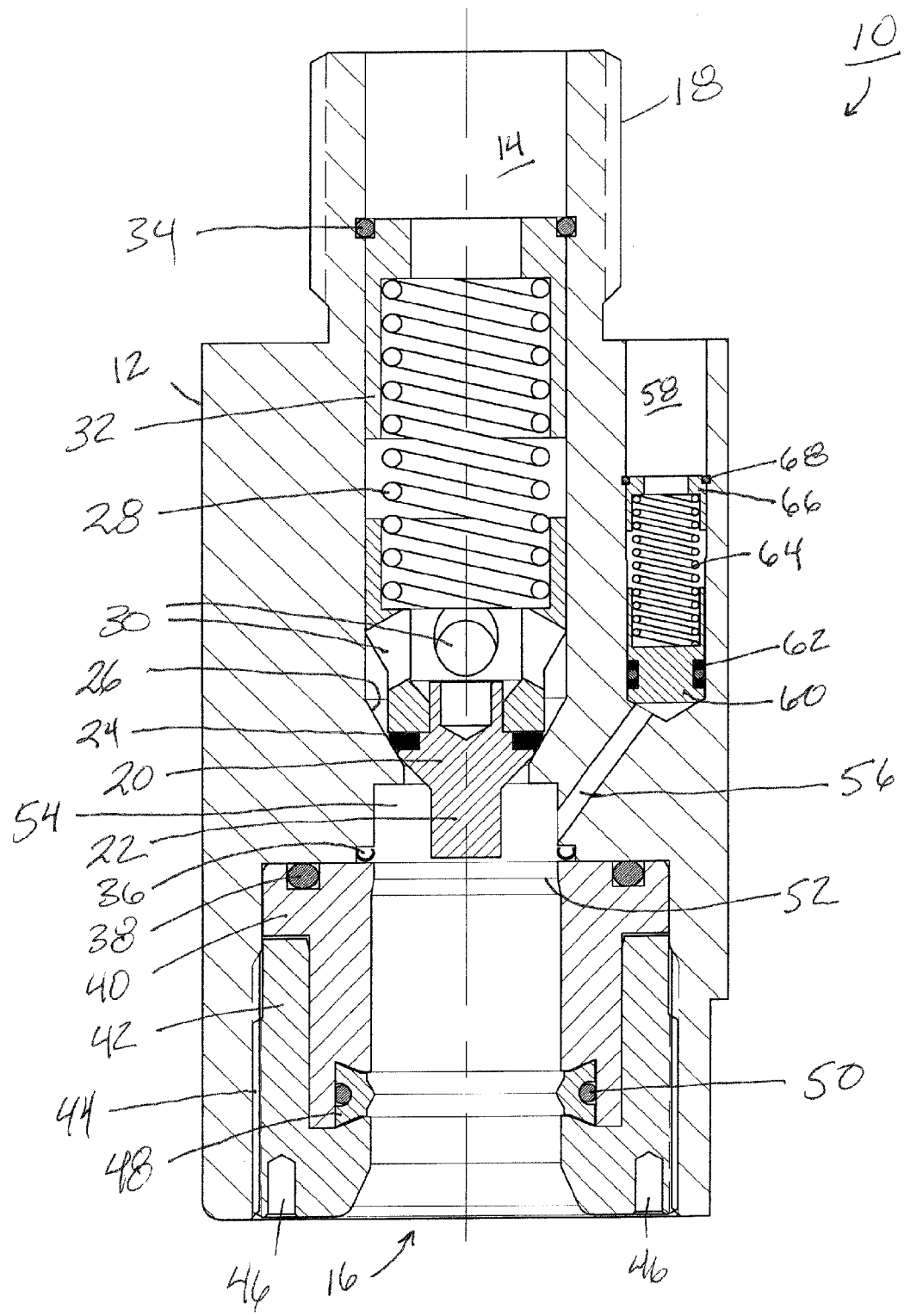
FIG. 1 is a cross-sectional view of a female hydraulic coupling member equipped with a displaced water compensation system according to the present invention.

The invention may best be understood by reference to an exemplary embodiment thereof. FIG. 1 depicts a female hydraulic coupling member 10 comprised of body 12 having central axial bore 14. One end of body 12 may have threaded connector 18 for connection to a hydraulic line or the like and the opposing end may comprise receiving chamber 16 for connecting to a corresponding male hydraulic coupling member.

The coupling member may be equipped with poppet valve 20 situated in central axial bore 14. The poppet valve may comprise a seal 24 for sealing against frusto-conical surface 26 of bore 14. Poppet valve 20 may be urged against surface 26 by spring 28 which bears against spring seat 32 retained in bore 14 by keeper 34. Poppet actuator 22, when depressed by a corresponding actuator in the male coupling member, acts to open the poppet valve by moving seal 24 away from surface 26 thereby permitting the flow of hydraulic fluid through the coupling by way of flow ports 30 in poppet 20.

The illustrated embodiment is equipped with a seal cartridge of the type disclosed in U.S. Pat. No. 7,163,190 to Robert E. Smith, III. The seal cartridge comprises inner ring 40 and outer ring 42 having threaded section 44 for engaging body 12 of the female coupling member. Outer ring 42 may be provided with engagement holes 46 for engaging a spanner or other tool which facilitates installation and removal. As shown in FIG. 1, inner ring 40 and outer ring 42 may have opposed, angled shoulders for retaining a crown seal 48 between them. Crown seal 48 may have an outer, circumferential seal 50 which may be an O-ring in certain embodiments for sealing between seal 48 and inner ring 40.

The inner end of ring 40 may have a circular groove for holding seal 38. Seal 38 may be an elastomeric O-ring seal for sealing between the seal cartridge and body 12.

Central axial bore 14 may have a shoulder for retaining seal 36 which, in the illustrated embodiment, is a metal C-seal. Seal 36 is held in position by the seal cartridge comprised of rings 40 and 42. Seal 36 may seal against the probe of a male member inserted in receiving chamber 16. In the illustrated embodiment, seal 36 has a smaller inside diameter than that of crown seal 48. A step 52 in the internal diameter of inner ring 40 accommodates a male probe having sections with different diameters. The innermost portion of receiving chamber 16 and, in particular, that portion which is inside of seal 36 and of reduced diameter is designated as volume 54 in FIG. 1.

Female coupling body 12 has blind hole 58 in the end of the body opposite the receiving chamber 16. Cavity 58 is a generally axial bore offset from the central axial bore 14. Fluid passage 56 connects the terminus of blind hole 58 with innermost section 54 of receiving chamber 16.

Piston 60 fits within cylinder 58 and is configured and sized to slide within cylinder 58. Piston 60 may comprise ring seal 62 for sealing engagement with the walls of cylinder 58. In certain embodiments, seal 62 may be a multipart seal.

Also within cylinder 58 is spring seat 66 retained by keeper 68 and compression spring 64 which acts against the spring seat to urge piston 60 towards the terminus of blind hole 58. It will be appreciated by those skilled in the art that other equivalent elastic members may be used for this purpose.

The operation of the displaced water compensation system (comprised of elements 56 through 68, inclusive) of female coupling member 10 is illustrated in FIGS. 2A and 2B.

FIG. 2A depicts the female coupling member 10 of FIG. 1 in partial engagement with a corresponding male coupling member 70. Male coupling member 70 may comprise cylindrical probe 72 the distal end of which may have a section 78 of reduced outside diameter. Male member 70 may also comprise poppet valve 76 and poppet valve actuator 74. In the extent of coupling member engagement shown in FIG. 2A, male poppet actuator 74 has just contacted female poppet actuator 22 (but poppet valves 76 and 20 remain closed) and the male probe 72 has engaged crown seal 48 in the receiving chamber of the female member 10.

In FIG. 2B, male coupling member 70 and female coupling member 10 are shown fully engaged. The mutual depression of poppet valve actuators 22 and 74 have opened poppet valves 20 and 76, respectively. In moving from the positions shown in FIG. 2A to full engagement (FIG. 2B), male probe 72 displaces seawater in section 54 of receiving chamber 16 of female member 10 and forces it through passage 56 into cylinder 58. This is particularly true for that portion of engagement during which section 78 of probe 72 is in sealing contact with seal 36 in female member 10. Under the action of the fluid pressure increase on the interior side of piston 60, piston 60 slides within cylinder 58 against the resistance of spring 64 thereby increasing the volume of the cylinder 58 that is inside piston 60. In this way, a hydraulic lock condition is avoided as the seawater in volume 54 is displaced into cylinder 58.

During coupling disengagement (i.e., moving from the condition shown in FIG. 2B to that of FIG. 2A), seawater retained in cylinder 58 inboard of piston 60 may move back into section 54 of receiving chamber 16 as male probe 72 is withdrawn and piston 60 moves within cylinder 58 under the influence of spring 64. In this way, a vacuum is avoided in receiving chamber 16 when the coupling members are separated. A vacuum (or reduced pressure) situation within the receiving chamber is known to be harmful to soft seals in particular which are prone to implode during coupling separation due to the high hydrostatic pressures encountered in subsea applications.

The displaced water compensation system (comprised of elements 56 through 68, inclusive) of female coupling member 10 is preferably sized to accommodate the volume of seawater that would otherwise be trapped in section 54 of receiving chamber 16. It will be appreciated that the displaced water compensation system of the present invention may comprise a plurality of cavity/piston combinations (58'-60') in a radial array in body 12 of female coupling member 10, each of which may be in fluid communication with the receiving chamber via a passageway 56'.

Although the invention has been described in detail with reference to certain preferred embodiments, variations and modifications exist within the scope and spirit of the invention as described and defined in the following claims.

What is claimed is:

1. A female undersea hydraulic coupling member comprising:
   a generally cylindrical body having a first end and a second end;
   a central axial bore extending from the first end to the second end of the body;
   a receiving chamber in the first end of the body dimensioned to receive an opposing coupling member;
   a generally cylindrical water displacement expansion chamber in the second end of the body offset from the central axial bore;
   a fluid passageway in the body connecting the receiving chamber and the water displacement chamber;
   a piston positioned in the water displacement chamber, the piston having a front face and a rear face, the piston slideable in response to pressure acting against the front face and rear face to allow fluid and/or gas to move between the receiving chamber and the water displacement expansion chamber; and,
   a seal between the piston and the water displacement expansion chamber to block fluid flow through the expansion chamber.

2. The undersea hydraulic coupling member of claim 1 further comprising a spring configured to exert pressure against the rear face of the piston.

3. The undersea hydraulic coupling member of claim 2 further comprising a spring seat retained within the expansion chamber configured to bear against the end of the spring opposite the rear face of the piston.

4. The undersea hydraulic coupling member of claim 1 wherein the seal between the piston and the water displacement expansion chamber is a ring-shaped elastomeric seal.

5. The undersea hydraulic coupling member of claim 4 wherein the seal is a multi-part seal.

6. A undersea hydraulic coupling member comprising:
   a body with a stepped internal central axial bore extending therethrough from a first end to a second end thereof, the bore comprising a receiving chamber adjacent the first end;
   a water displacement expansion chamber in the second end and radially offset from the central axis of the body;
   a piston slideable in the water displacement expansion chamber, the piston having a front face facing the first end of the bore and a rear face facing the second end of the bore, the piston slideable in response to fluid and/or gas pressure acting against the front face and rear face thereof to allow fluid and/or air gas from the receiving chamber to enter or exit the water displacement chamber, and
   a seal between the piston and the water displacement expansion chamber to block fluid flow through the water displacement expansion chamber.

7. A female hydraulic coupling member comprising:
   a generally cylindrical body having a first end and a second end;
   a central axial bore extending from the first end to the second end of the body;
   a receiving chamber in the first end of the body dimensioned to receive an opposing coupling member;
   a plurality of generally cylindrical water displacement expansion chambers in the second end of the body offset from the central axial bore, each water displacement expansion chamber having a piston positioned therein, the pistons having a front face and a rear face, the pistons slideable in response to pressure acting against the front face and rear face to allow fluid and/or gas to move between the receiving chamber and the water displacement expansion chambers; and, a seal between each piston and the water displacement expansion chamber in which the piston is positioned to block fluid flow through the expansion chamber;
   a plurality of fluid passageways in the body connecting each of the water displacement expansion chambers to the receiving chamber.

* * * * *